Patented Nov. 27, 1928.

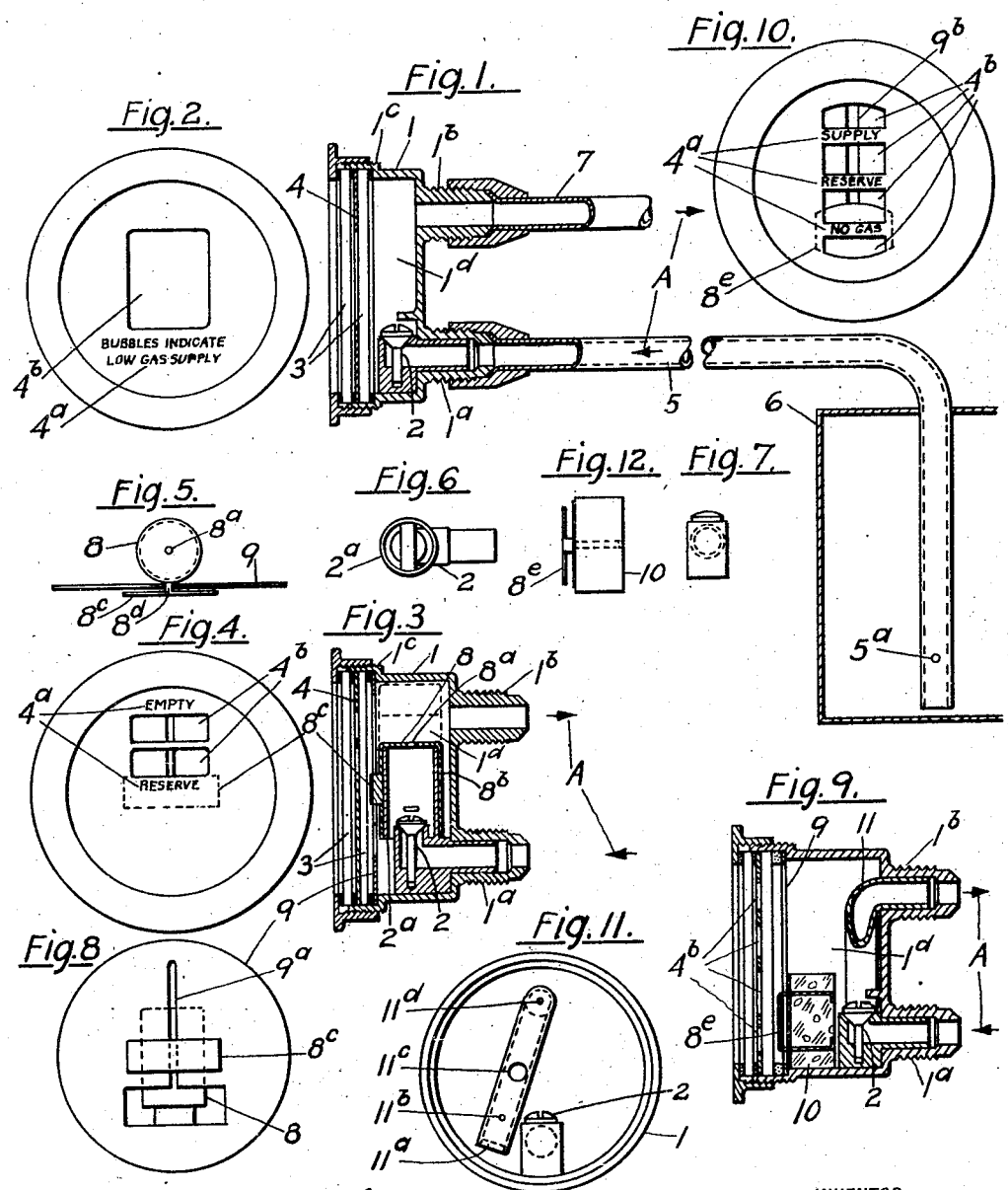

1,693,031

UNITED STATES PATENT OFFICE.

HERBERT HASTINGS, OF BRIGHTON, NEW YORK.

FLUID INDICATOR.

Application filed May 21, 1924. Serial No. 714,948.

My invention relates to an improved means of indicating at a distance from a container or tank the amount of liquid therein as for instance indicating at the forward part of an automobile the amount of fuel in a tank carried at the rear, and the objects of my invention are: To indicate the relative amount of fluid in an automobile fuel tank by admitting to the motor feed tube at different levels in the tank small proportions of air with the fuel and automatically visualizing these relative proportions at another point in the feed tube; to provide such a device that shall be free from the complications, delicacy, and manufacturing expense inherent in the present hydrostatic or pressure devices; to utilize in such a device to a greater extent than before the parts already in common use on automobiles, etc. for fuel feed purposes; to provide means for indicating whether or not fuel is passing through the fuel tube; to provide means for indicating if and when there is a leak in the fuel feed tube. These objects may be obtained in a variety of ways.

I have chosen to illustrate my invention in the accompanying drawings in which

Fig. 1 is a vertical sectional view of one form of such a device shown connected to a fuel tank.

Fig. 2 is a view of the face of the instrument shown in Fig. 1.

Fig. 3 is a vertical sectional view of a second form of indicating device.

Fig. 4 is a front view of the instrument shown in Fig. 3.

Fig. 5 is a view looking at the top of the floating piston and guide plate of Fig. 3.

Fig. 6 is a view looking at the top of the inlet valve and piston tube of Fig. 3.

Fig. 7 is an end view of the inlet valve of Fig. 1.

Fig. 8 is a front view of the guide plate shown in Figs. 3 and 5.

Fig. 9 is a vertical sectional view of a third form of indicating device.

Fig. 10 is a front view of the device shown in Fig. 9.

Fig. 11 is a front view of the device shown in Fig. 9 with the cover, glass, dial assembly, and float removed.

Fig. 12 is a top view of the float assembly shown in Fig. 9.

Similar reference characters refer to similar parts throughout the different views.

1 is a body or case and is provided at one end with an inlet stem $1^a$ and an outlet stem $1^b$ each adapted to accommodate any preferable form of tube connection, the "flared tube" form being illustrated and at the other end is provided with any preferable provision for accommodating a bezel or cap, as the threads at $1^c$ and this end is further provided with a glass and dial recess having between it and the other end a fluid chamber as at $1^d$. Secured in the inlet stem and projecting into the fluid chamber is an inlet check valve 2 adapted to permit the free passage of fluid into the chamber and to prevent passage in the reverse direction. One end of this chamber is closed liquid tight by one or more crystals 3. I have shown two such crystals so as to permit mounting between them an indicator plate 4 bearing suitable indicia as at $4^a$ together with openings as at $4^b$ through which the fluid or other indicating means within the fluid chamber is visible. In Fig. 1 I have shown the inlet stem connected by a tube 5 to a fluid storage tank 6 and the tank end of this tube is open for the free entry of fluid and at a distance above the end of the tube hole $5^a$ is provided through the side wall of the tube; to the outlet stem is connected a tube 7 which is connected to the vacuum feed tank if used with a vacuum system as in use on automobiles, or to the carburetor if used with the pressure system, in either of these systems the flow of fluid being indicated as to direction by the arrows A.

The simplest form of my invention illustrated in the drawings, is shown in Fig. 1 and operates as follows. The fluid is forced out of the tank up through the tube 5 past the check valve 2 into the chamber $1^d$ and out through the discharge tube 7 and when the fluid in the tank covers the port hole $5^a$ in the tube the fluid column throughout the tubes and chamber will be unbroken and practically free from air bubbles but when the level of the fluid reaches the hole 5ª a small amount of air is taken up with the fluid and in passing through the chamber 1ᵈ these air bubbles are visible through the opening 4ᵇ and thus notify the observer that the fluid supply is down to the amount represented by the distance the hole 5ª is above the bottom of the tank and reminds him to replenish the fuel. The size of this hole is relatively small as compared to the tube diameter so that the air taken in through it does not materially or disadvantageously reduce the amount of fluid passing through the tube. Further as the fluid continues to be drawn off after the level passes below 5ª the amount of air increases so that the bubbles passing the visual opening 4ᵇ increase as the supply in the tank diminishes and when the level drops below the end of the tube the proportion of air suddenly increases producing first a turbulence in the chamber which ends in a cessation of both the bubbles as well as the fluid flow, all of which is observable through the visual opening. When the fluid in the tank is above the port hole, particularly in automobile use, there are very small air bubbles constantly entrapped and suspended in the fluid and as these pass behind the visual opening they assist to indicate the passing of fluid through the chamber. When used in connection with vacuum systems in which the fuel feed is intermittent the fluid in the tube 5 is allowed to run back into the tank between the feed. A check valve 2 is provided to prevent the flow of fuel from the chamber 1ᵈ back to the tank and to maintain the chamber full of fluid when the level in the tank is above the port hole, and thus this check valve operates to prevent the intermittent bubbling period which otherwise would occur while the system is filling up. I have shown only one port hole 5ª but it is obvious that a number of such holes could be used at spaced vertical distances and thus indicate by the step by step increase in the amount of air bubbles passing through, when the fluid level reaches the heights of the successive port holes.

In order to provide a more distinct indication than is provided by the bubbles referred to above, I have illustrated two different devices in Figs. 3 to 12 which use the same general casing 1 including the check valve, crystals, indicator plate etc. as in the above described device. The device in Fig. 3 illustrates above the check valve a vertical cylindrical tube 2ª open at the top and bottom with the valve discharging within it, and on the outside of this tube a hollow piston 8 is free to slide up and down. The upper end of this piston is closed with the exception of a small hole 8ª, the side of the piston being provided with a second perforation 8ᵇ spaced down from the top, the piston being also provided with a plate 8ᶜ spaced away from the shell thereof so as to leave a narrow neck portion 8ᵈ and this neck portion is adapted to slide freely in the slot 9ª in the guide plate 9 which plate keeps the piston from turning and also covers the fluid chamber and parts therein. The indicator plate 4, Figs. 3 and 4 is provided with two perforations 4ᵇ and the color of this plate and the parts back of it and the color of the piston plate 8ᶜ are intended to be in sharp contrast as black and white so that the plate 8ᶜ is quickly and readily noticeable through the perforations 4ᵇ when in line therewith. The inlet and outlet stem are connected as described on Fig. 1.

The description above as to the operation of the device of Fig. 1 applies also to that of Fig. 3 excepting that instead of observing the passage of the air bubbles through the chamber these air bubbles are made to operate a movable indicator namely the piston plate 8ᶜ. As already recited the inlet valve of Fig. 3 discharges inside the stationary tube 2ª, and therefore inside the vertically movable hollow piston 8 having an outlet at the bottom thereof leading into the chamber 1ᵈ, and under normal conditions namely when the fluid in the tank covers the port 5ª the piston 8 will remain at the bottom of its travel and the plate 8ᶜ will be hidden back of the indicator plate as shown in Fig. 4. But when the fluid level reaches the port hole 5ª and air bubbles come through the valve with the fluid this air is trapped under the piston 8 and lifts it, and if the wall of the piston were solid from top to bottom it would be lifted to the top of the chamber. In order to indicate the relative amount of air and fluid coming through, as for instance when the fluid level is below 5ª only and again is also below the end of the tube, a hole 8ᵇ is provided in the wall of the piston at such a distance down from the end that when the piston has raised enough to bring a portion of this hole above the upper end of the tube 2ª and thus permit the escape of the air the plate 8ᶜ will occupy the space directly back of the lower perforation 4ᵇ Fig. 4 and thus show white surrounded with black and indicate that the "Reserve" level of fuel supply has been reached. The hole 8ᵇ is proportioned to allow slightly more air to pass through it than can possibly enter through the port 5ª and therefore as long as the fluid level is below the port and above the end of the tube the piston will remain at the "Reserve" position. However, as soon as air enters the lower end of the tube faster than it can pass through the hole 8ᵇ the piston will be raised by the additional air trapped thereunder and the plate 8ᶜ will show directly opposite the upper perforation 4ᵇ Fig. 4 and indicate "Empty". In order to prevent the very small air bubbles, which are normally carried by the fluid, from accumulating under the piston and possibly raising it before the fluid level has reached the port hole $5^a$ a small hole $8^a$ is provided in the head of the piston to permit a small amount of air to pass through without lifting the piston. From the above it will be seen that a multiple of different fluid levels in the tank may be indicated by the same number of positions of the indicator plate $8^c$ by providing a plurality of vertically spaced port holes $5^a$ and a multiple of vertically spaced holes $8^b$ in the side wall of the piston 8, these holes being proportioned so that they will correspond in air capacity singly and accumulatively to the air passing through the port holes $5^a$ singly and accumulatively so that the piston will be raised step by step as each successive port hole is uncovered by the lowering of the liquid in the tank.

In Figs. 9 to 12 is illustrated a third type of device embodying my invention and in addition to the details above described relative to Figs. 1 and 2, it has a float 10 which carries a float plate $8^e$ which is guided in the slot $9^b$ running from near the top to near the bottom of the guide plate 9 of Figs. 9 and 10 in a manner similar to that described for guiding the piston of Fig. 3. Also within the outlet stem $1^b$ is inserted the bent tube 11 which extends downwardly toward the bottom of the fluid chamber $1^d$, this tube being plugged at its lower end $11^a$ and being provided with small holes at three different heights as at $11^b$, $11^c$ and $11^d$, the combined areas of these holes being proportioned so that it requires all of them to discharge the fluid entering the chamber when the level in the tank is above the port $5^a$, the hole $11^d$ also serving to take off the small amount of air normally trapped in the fluid. When the fluid in the tank is above the port hole $5^a$ and feeding through the system as stated above, the fluid in the chamber $1^d$ Fig. 9 is approximately level with the hole $11^d$ and the float is then in the topmost position in which the plate $8^e$ is directly back of the upper bar $4^a$ marked Supply Fig. 10, and thus throws that reading into relief indicating that the level of the fluid in the tank is above the port hole or reserve level. When the level of the fluid in the tank reaches the port hole $5^a$ more air is taken through with the fluid than can be discharged through the hole $11^d$ Fig. 11 and therefore the fluid level and the float with it drops to the center hole $11^c$ and the plate $8^e$ carried by the float centers directly back of the central bar $4^a$ marked Reserve Fig. 10, and indicates that the reserve supply of fluid is being drawn off. The level of the fluid in the chamber $1^d$ will then remain at this central level until a larger proportion of air enters through the lower end of the feed tube than can be carried off through the hole at which time the fluid level in the chamber and the float will drop to the hole $11^b$ and the lower bar $4^a$ Fig. 10 will be thrown into relief and indicate No gas. It will also be evident that a number of fluid levels in the tank may be indicated by providing additional holes $5^a$ at different levels and corresponding holes $11^b$, $11^c$, $11^d$, etc. properly proportioned as to size to keep in step with the capacities of the holes $5^a$.

From the foregoing it will be seen that my invention not only indicates certain levels of fluid in the tank, but it also indicates whether or not the fuel is feeding properly and thus in case of motor trouble it at once answers the question as to whether or not fuel is passing to the vacuum tank. Also if the fuel feed line should develop a leak between the tank and the indicator the leak will be indicated by this device when the fuel level in the tank is above the port holes in the feed tube.

It is possible to replace the port holes $5^a$ with a long slot commencing at the top and extending toward the bottom of the tube and also use a slot extending lengthwise of the shell of the piston 8 instead of the hole $8^b$ for the device shown in Fig. 3 or a slot in the tube 11 instead of the holes $11^b$, $11^c$, $11^d$ for the device illustrated in Fig. 9. This arrangement would give a constantly increasing percentage of air feed as the level in the tank lowers which would be reflected in the indicator.

Having thus described my invention what I claim as new and desire to secure by Letters Patent is—

1. In combination with a liquid feed system a feed tube provided with vertically spaced inlet openings disposed below the normal surface of the liquid to be fed and adapted to take in proportions of air and liquid varying as the depth of said liquid varies and means including a piston operated by said varying proportions of air and liquid for indicating successively the fall of liquid below said openings.

2. In combination a liquid container, an outlet conduit therefor, arranged means for receiving varying proportions of air and liquid as the liquid level in said container varies, said conduit being also provided with means for preventing back flow to the container and means controlled by said varying proportions of air and liquid for indicating varying levels of the liquid.

3. In combination a liquid supply tank having a tube therein provided with vertically spaced openings and having a fluid holding chamber intermediate its ends, said tube being adapted to convey liquid from the tank and to discharge it into said fluid chamber, the latter having vertically spaced openings so proportioned that when one of the outlet openings in said tube becomes uncovered as the liquid level in the tank lowers the liquid level in said chamber drops to the corresponding outlet opening and means for indicating said level.

4. The combination of a liquid container, a conduit extending into said container provided with spaced inlet ports for allowing varying proportions of air to enter the conduit with the liquid as the liquid level in the container varies, means within said conduit including a floating member automatically changing its position each time the proportions of fuel and air are varied for successively indicating said proportions without interfering with the flow of liquid through the conduit.

5. In combination with a fluid feed system a fluid storage tank, an inlet tube extending therein and provided with vertically spaced inlet openings, a body forming an inclosed fluid chamber connected with said tube, an outlet tube extending vertically within the chamber and leading therefrom and provided with vertically spaced outlet openings so proportioned that when an inlet opening becomes uncovered as the fluid level in the tank lowers, the fluid level in said chamber drops to the corresponding outlet opening and means for visualizing said level.

6. In combination with a fluid feed system a fluid storage tank, an inlet tube projecting therein and provided with vertically spaced inlet openings, a body forming an inclosed fluid chamber, an outlet tube extending vertically within the chamber and leading therefrom and provided with vertically spaced outlet openings so proportioned that when an inlet opening becomes uncovered as the fluid level in the tank lowers, the fluid level in said chamber drops below the corresponding outlet opening and means including a float adapted to indicate said level.

7. In combination with a fluid feed system, a supply tank, a body adapted to form a fluid chamber and provided with an outlet tube and an inlet tube extending into said supply tank and provided with means for successively admitting air to the inlet tube at different levels above the empty position without stopping the flow of the fluid and means within said chamber controlled by the fluid and air therein for indicating at which level air is entering said inlet tube.

8. In an indicator, the combination of a fuel supply source and a conduit adapted to conduct fuel therefrom and arranged to receive air with the fuel varying in proportion as the fuel level varies without stopping the flow of fuel and a member actuated by the flow of mixed air and fuel by which the level of the fuel is indicated through the varying proportions of air and fuel.

9. In an indicator, a fluid supply source, a fluid supply conduit connected therewith, an indicator case adapted to form a portion of said conduit, said conduit being provided with means for admitting fluid during all levels of the supply source and also provided with means for admitting air with the fluid at certain levels below the high level of the supply fluid and a device within said indicator case by which the level of fluid is indicated through the varying proportions of air and fluid passing through said case.

10. In combination a fluid receptacle, a conduit leading therefrom constructed to receive air and fluid varying in proportions as the fluid level within the receptacle varies, an indicator case adapted to form part of said conduit having a transparent wall portion and provided with a self-contained device responsive to the varying proportions of air and fluid passing therethrough whereby different levels are indicated by said device through said transparent wall portion.

11. In combination a fluid supply tank, a conduit adapted to conduct both fluid and air therefrom in graduated proportions varying as the fluid level in the tank varies, means incorporated in said conduit adapted to allow air to pass in graduated amounts varying with said first graduated proportions and an indicator controlled by the air and the fluid in the conduit adapted to visibly indicate different levels of the fluid in the tank and means for preventing the return of the fluid to the tank.

12. In a fluid indicator the combination of a fuel feed passage provided with vertically spaced inlet openings and vertically spaced outlet openings proportioned so that air entering at a certain inlet opening escapes at a certain outlet opening and means for visualizing through which opening air is passing.

13. In combination with a fluid feed system, a fluid storage tank, a fluid supply conduit leading therefrom provided with an opening spaced above its lower end, said conduit having indicating means movable therein at a point intermediate its ends including a recessed element for accumulating air admitted through said opening and by which the element is moved to automatically shift its position when the fluid falls below said opening.

14. In a fluid feed system, a fluid storage tank, a fluid supply conduit leading therefrom provided with an opening spaced above its lower end, a casing interposed in said conduit, an inverted air receiving element slidably mounted within the casing responsive to the pressure of air supplied thereto through said opening when the fluid in said tank falls below the opening and indicating means moved by said element from a normal to a predetermined indicating position.

15. In combination with a fluid feed system, a fluid storage tank, a fluid supply conduit leading therefrom provided with openings at different levels within the tank, a casing having a chamber connected with the outer end of the supply conduit, a second supply conduit leading from said casing, said chamber having a plurality of discharge openings at different levels, each communicating with the second mentioned conduit, said discharge openings being so arranged that when an opening in the first mentioned conduit becomes uncovered as the fluid level in the tank is lowered the fluid level in said chamber will drop to the corresponding discharge opening and means for successively indicating the change of level of fluid within the chamber from one discharge opening to another.

HERBERT HASTINGS.